INVENTOR.
JOHN T. CLARKE
STEPHEN N. HALL
BY

United States Patent Office 2,729,603
Patented Jan. 3, 1956

2,729,603

MANUFACTURE OF BENZENE HEXACHLORIDE

John T. Clarke and Stephen N. Hall, Baton Rouge, La., assignors to Ethyl Corporation, New York, N. Y., a corporation of Delaware Application January 23, 1952, Serial No. 267,836

4 Claims. (Cl. 204—163)

This invention relates generally to a process particularly involving an exothermic reaction, in which at least one of the reactants is a gas and is normally soluble in a liquid phase of the reaction mass only in limited quantities under operative conditions of the process. More particularly, but not exclusively, the invention relates to a continuous photochemical process for commercial manufacture of benzene hexachloride (1,2,3,4,5,6-hexachlorocyclohexane) having a relatively high percentage of gamma isomer.

Benzene hexachloride as normally produced consists of a mixture of space isomers, of which the gamma is the only isomer which is insecticidally active to any appreciable extent. For this reason, a favorable yield of the gamma isomer is essential in any commercial process for the manufacture of benzene hexachloride.

There is evidence that low temperature reaction conditions favor the production of the gamma isomer. However, the reaction of chlorine and benzene to form benzene hexachloride is an exothermic reaction, and thus throughput capacity of a reaction apparatus and the cost of refrigerating equipment must be considered as balancing factors in determining the most economical operating conditions for any process of this type.

A continuous process for the manufacture of benzene hexachloride has previously been carried out in a pipe-type continuous reactor, the chlorine and benzene being fed into one end of the reactor and the products of the reaction removed at the opposite end thereof. This process has had the following disadvantages:

(1) Excessively high temperatures, particularly in the initial stages of the reactor, with a consequent low yield of gamma isomer in the product.

(2) Low throughput capacity of the equipment due to high temperatures within the reactor and the presence of a large proportion of gaseous phase in the reactor, particularly in the initial or inlet section thereof.

One of the major causes for each of the above difficulties results directly from the necessity of feeding quantities of chlorine in excess of its solubility in the benzene feed at the desired operating temperature. It generally is desired to control the feed ratio of chlorine to benzene so as to produce a product essentially consisting of a saturated solution of benzene hexachloride in benzene, approximately 20 to 60 grams of benzene hexachloride per 100 grams of benzene, depending upon the temperature, and preferably about 22 grams per 100 grams of benzene at a temperature of 30 degrees centigrade.

The quantity of chlorine relative to benzene required by the above feed ratio results in large quantities of undissolved chlorine in the initial stages of the reaction. For example, when the process is conducted at 30 degrees centigrade and one atmosphere of chlorine pressure, only about 80 percent of the chlorine feed will theoretically dissolve in the benzene solution, prior to reaction of the components to benzene hexachloride. Thus, under these conditions the feed stream prior to reaction consists of about 95 percent by volume chlorine in the gaseous phase, at atmospheric pressure. At higher temperatures, the volumetric ratio of the gaseous phase to the liquid phase is considerably higher. For example, at 50 degrees centigrade only about 25 percent of the gaseous chlorine dissolves and the feed stream is thus about 98 percent gaseous. For this reason, the capacity of any pipe-type continuous reactor is materially reduced and the heat conductivity of the system at the point of maximum reaction rate and maximum heat evolution is substantially impaired due to the relatively low heat transfer coefficient of the gaseous film.

The term "pipe-type continuous reactor," as used herein, is a reactor in which no mixing occurs from one stage to the proceeding stage in the reactor body as the reactants move at a uniform rate through the reactor. Such a reactor provides reaction conditions which at least simulate a batch-type process, carried out in a continuous manner. This type of reactor may be contrasted with a pot-type continuous one-stage reactor in which the reactor is provided with perfect mixing so that the continuous overflow or recovered product has the same composition as the reactor solution throughout the reactor.

In practice, the capacity of any pipe-type continuous reactor has been limited by the heat evolution in the reactor. Thus, in actual operation, the feed rate had to be maintained substantially below the maximum capacity of the equipment so as to obtain a favorable distribution of the gamma isomer in the resultant product. Accordingly, in addition to the reduction of throughput capacity resulting from excessive quantities of gaseous phase, the capacity of the equipment was further limited due to the inherently poor heat conductance characteristics of the reactants themselves. The latter problem resulted in localized heating and poor gamma isomer production and this problem could not be satisfactorily solved by improved and expensive external refrigerating apparatus.

The prior process had the further disadvantage of inflexibility during operation. With any given process equipment, all of the variables, such as feed rates, length of reactor, etc. are normally fixed. In practice, reaction poisons frequently enter the system, for example, as impurities in the chlorine feed, which materially lower the reaction rate of the process. Thus, the percent conversion of the reactants varied during normal operation and suitable means were not available in the prior process to compensate for such variations.

Another disadvantage in the above prior process resulted from undesired gases, such as air, entering the system in the feed stream. This gas was carried with the reaction mass throughout the entire system and limited the capacity of the reactor and the heat transfer characteristics of the system.

It is accordingly an object of the present invention to improve processes in which compounds are formed from one or more gaseous reactants, particularly in an exothermic reaction, which reactants are soluble only to a limited extent in the reaction solution or other solvent, so as to permit (1) substantially complete dissolution of the gaseous reactants in the solvent, and (2) a sensitive means of control over critical variables in the process.

Another object of the present invention is to provide a process for the manufacture of a benzene hexachloride product having a relatively high gamma content.

Another object of this invention is to provide a process of the above type which is capable of high capacity production of benzene hexachloride per unit volume of reaction zone and which does not require costly and complicated refrigerating equipment to maintain a reasonable low reaction temperature.

Still another object is to provide a process for the manufacture of benzene hexachloride which is capable of being conducted in a continuous flow-type reactor and which process inherently provides substantially uniform heat evolution distribution throughout the entire length of the reactor.

Still another object of this invention is to provide a highly flexible process of the above type in which the temperature of the reaction, the percent conversion of chlorine, and the capactiy of the apparatus may be easily fixed for maximum economy and efficiency, and particularly in which the temperature of the reaction and the reaction rate may be accurately controlled while maintaining a substantially constant percent conversion of the reactants.

Another object is to provide a process which does not exhibit the sensitivity with respect to reaction poisons or inhibitors encountered in prior methods.

Another object is to provide a process of the above type in which air or other undesired gas may be readily and easily bled from the reactants without the same remaining in the reaction zone during the entire contact time required for the desired conversion of the reactants.

Still another object of the present invention is to provide a process in which the formation of substitution products of chlorine and benzene is substantially eliminated.

Other objects and advantages of this invention will be apparent from the following description and appended claims, especially when considered in connection with the accompanying drawings, wherein:

According to the present invention, benzene and chlorine in any desired proportions, and preferably in such proportions as to produce substantially saturated solutions of benzene hexachloride in benzene, are reacted continuously in the presence of actinic light. The reaction is preferably conducted in a pipe-type continuous reactor having external cooling means, such as a cooling water cascade or water jacket. However, the several advantageous features of this proces may be attained in any flow-type continuous reactor. By a "flow-type continuous reactor" we means any reactor in which there is a change in composition of the reactor solution from the inlet end theref to the outlet end thereof.

The novel feature of this invention consists in carrying out at least a part of the reaction to form benzene hexachloride under conditions in which a portion, and preferably a major portion, of the reaction stream is mixed with fresh chlorine and benzene feed and recycled through the reactor. The actual ratio, the weight of the reaction stream relative to the weight of the feed chlorine and benzene, hereinafter referred to as the recycle velocity ratio, which is recycled is dependent upon the actual conditions of the individual process. However, the optimum recycle velocity ratio may be determined with reference to the accompanying data and graphs.

Figure 1:
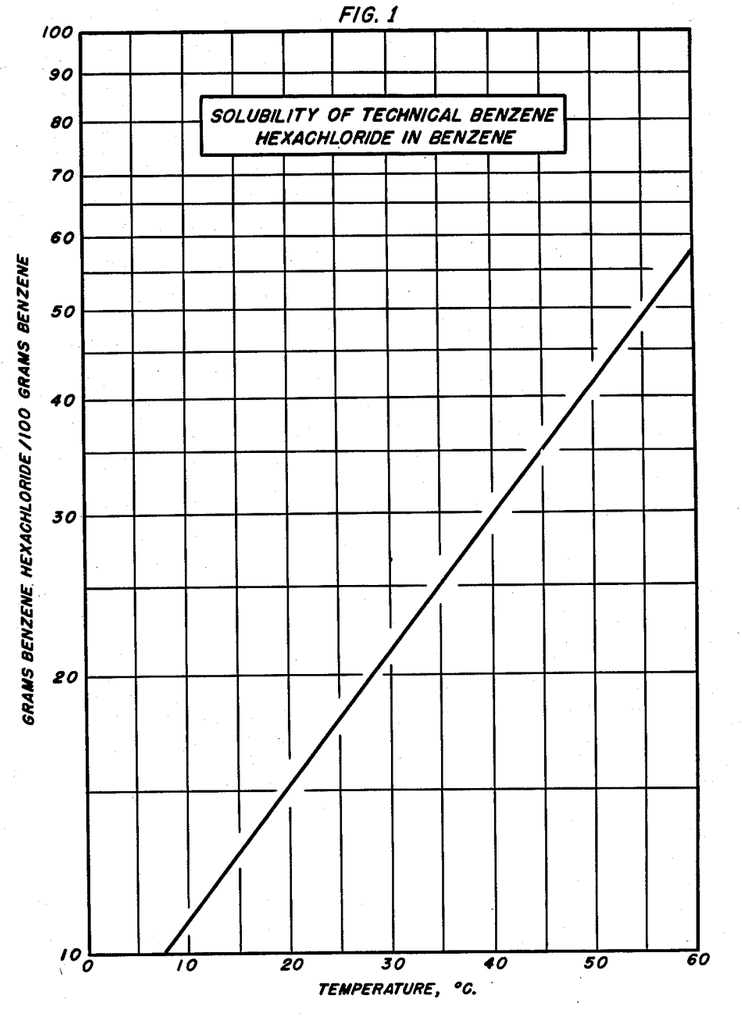
Figure 1 is a graph of the solubility of technical benzene hexachloride per 100 grams of benzene plotted against temperature.

In determining the optimum recycle velocity ratio for a given operation, the preferred product composition is chosen and the desired operating temperature is selected, generally between 15 degrees centigrade and 40 degrees centigrade and preferably about 30 degrees centigrade. The solubility of benzene hexachloride in benzene at the selected temperature conditions is then obtained from the graphs shown in Figure 1. At 30 degrees centigrade, for example, about 22 grams of benzene hexachloride are soluble in 100 grams of benzene. Accordingly, about 15 parts by weight of chlorine are required per 100 parts by weight of benzene to produce a saturated solution of benzene hexachloride in benzene. While this product is frequently desired, somewhat lower concentrations may also be desired.

Figure 2:
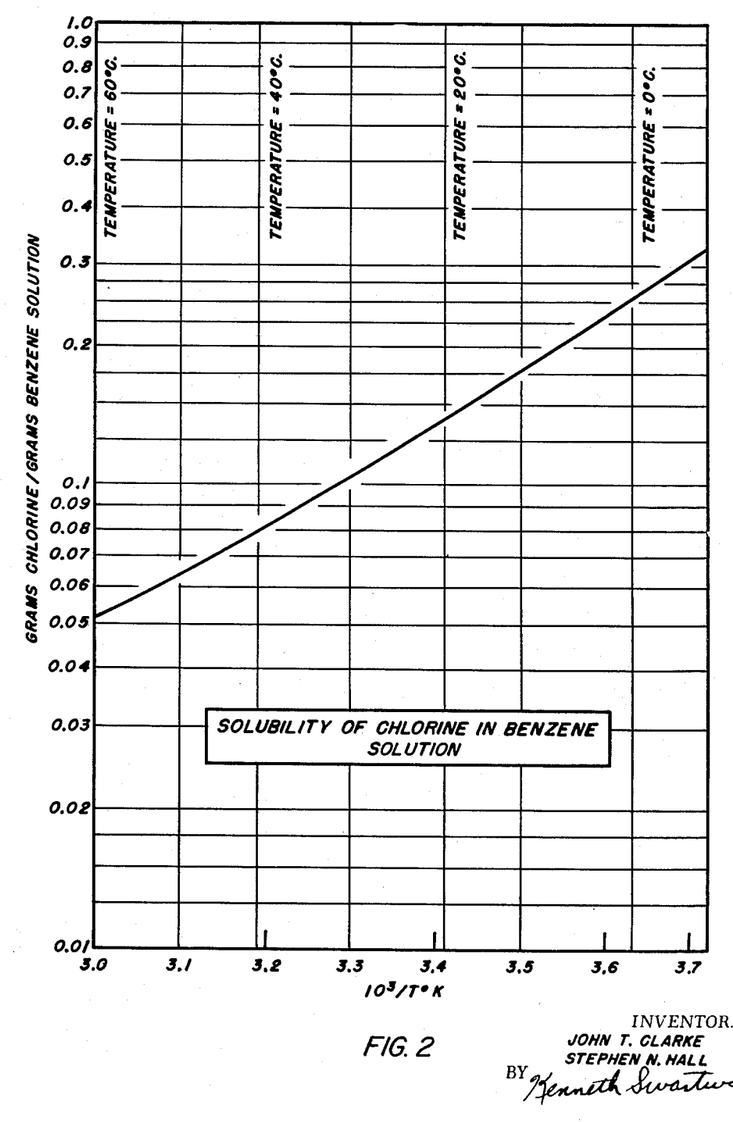
Figure 2 is a graph of the solubility of chlorine in benzene solution, also plotted against temperature.

With reference to Figure 2, it will be noted that at 30 degrees centigrade, only 10.6 parts by weight of chlorine are soluble in 100 parts by weight of benzene solution at atmospheric pressure. Therefore, about 95 percent by volume of the feed stream (prior to admixture with the recycle stream) would be undissolved chlorine gas.

Figure 3:
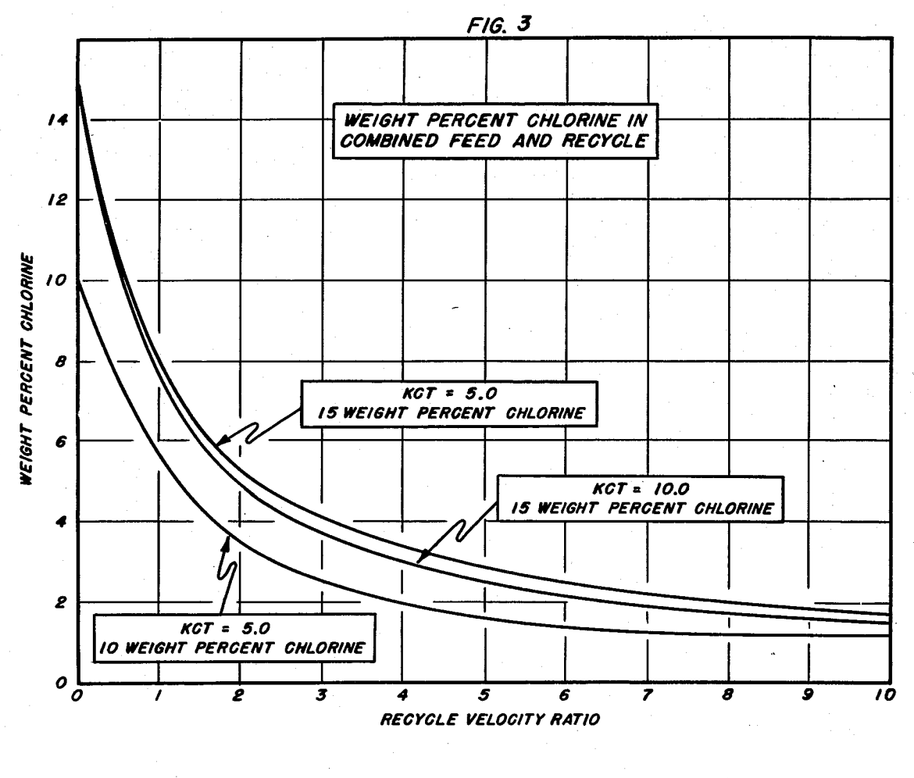
Figure 3 is a graph of the weight percent chlorine in the combined fresh feed and recycle stream plotted against recycle velocity ratios, employing different KCT values (reaction rate factor X contact time) and also using solutions of different chlorine concentrations at zero recycle velocity ratio.

Figure 3 shows a plot of the chlorine concentration in the reactor feed stream (feed chlorine and benzene plus the recycle stream) using a 15 weight percent feed at different KCT values (reaction rate factor X contact time) as the recycle velocity ratio is varied from 0 to 10. (The contact time may be calculated as equal to the weight of the solution in the reactor divided by the weight of fresh feed chlorine and benzene per unit time.) It will be noted that, as the recycle velocity ratio is initially increased, the weight percent chlorine in the reactor feed is rapidly reduced. Thus, at a recycle velocity ratio of approximately 10, the chlorine concentration is reduced from about 15 weight percent to about 1.5 weight percent. It is apparent therefore that substantially all of the feed chlorine is soluble in the reactor stream and essentially all of the problems inherent in prior processes discussed above involving the undissolved chlorine gas are eliminated.

Figure 3 also shows the effect of various recycle velocity ratios when employing fresh feed streams of various chlorine concentrations and various KCT values. From the graph, it is believed apparent that reducing the chlorine concentration in the fresh feed stream or increasing the KCT value permits lower recycle velocity ratios for a given desired chlorine concentration in the reactor stream. Thus, variation of the recycle velocity ratio up to about 10 materially increases the solubility of the feed chlorine in the reaction stream, whereas further increases in the recycle velocity ratio beyond 10 at ordinary KCT values does not materially effect the solubility characteristics thereof. While about between 9 and 11 is the preferred ratio range, greater ratios may be employed so as to improve, for example, the heat dissipating properties of the system.

Figure 4:
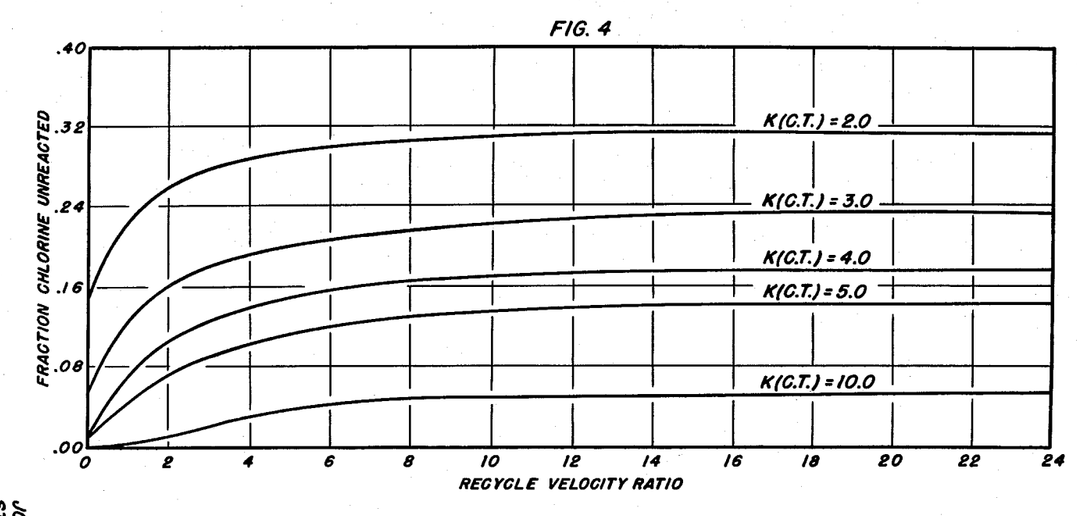
Figure 4 is a graph in which the fraction of chlorine unreacted in the product of the first reactor is plotted against the recycle velocity ratio, using various KCT values.

In general, the use of a recycle results in a reduction of the percent conversion of the chlorine to benzene hexachloride, as shown particularly in Figure 4. The latter feature provides a means to control and regulate the process during actual operation, which means was not available in prior processes. This control is highly important in the initial rapid-rate phase of the reaction so as to assure a favorable yield of the gamma isomer. The second phase of the reaction, comprising the clean-up of the remaining 10 to 30 percent of the chlorine, is carried out under batch-type conditions (without recycle). This again is a highly important feature of this invention since it permits utilization of all of the valuable chlorine while obtaining in both stages a very favorable gamma isomer distribution in the product. The heat evolution during the chlorine clean-up is not appreciable, in contrast to the first stage, whereas the rate of reaction tends to be slow and must be favored. Thus, the use of a two-stage operation assures a high production of the gamma isomer in the product, a high throughput capacity from the equipment, and elimination of scrubbing equipment, waste chlorine and caustic. The latter was formerly required to scrub the unreacted chlorine from the benzene hexachloride product.

The recycle velocity ratio may be increased, if desired, somewhat above that which is required for substantially complete solubility of the feed chlorine in the benzene, as noted above. Increased velocities in the reactor tend to reduce the temperature differential between the inlet and outlet end of the reactor so as to provide more uniform conditions throughout the same, and also tend to reduce the mean temperature of the reaction by materially improving the heat conductivity properties of the system.

Figure 5:
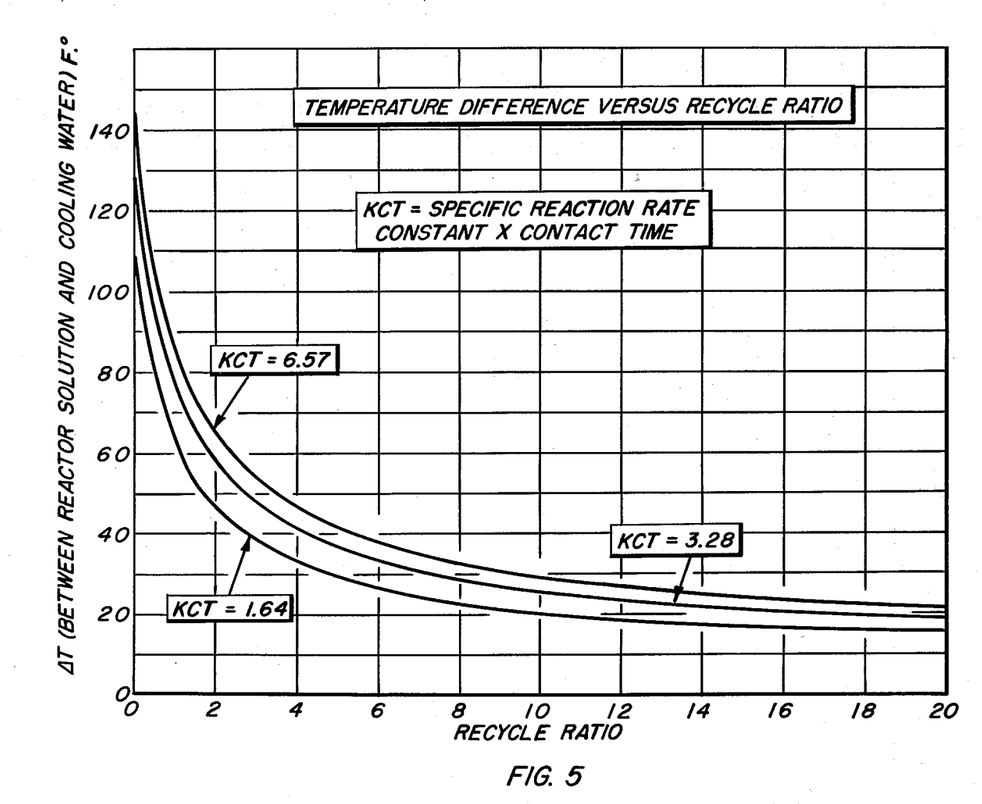
Figure 5 is a graph in which the temperature difference between the reactor solution and cooling medium is plotted versus recycle ratio.

With particular reference to Figure 5 of the drawings, in which the difference in temperature (F.°) between the reactor solution and the cooling water is plotted versus the recycle velocity ratio at different KCT values, it will be seen that as the recycle velocity ratio is increased, the temperature difference is rapidly reduced. However, of even greater importance, it will be noted that this is not a linear change but instead the major change occurs between the range of about 0 to 10 recycle ratio. Thus, increasing the recycle ratio above about 10 does not materially affect the mean temperature of the reaction mass within the reactor.

The data plotted in the above graph was determined when employing a four inch diameter resin impregnated graphite pipe. The cooling water increase from the inlet to the outlet was about 5° F.

Figure 6:
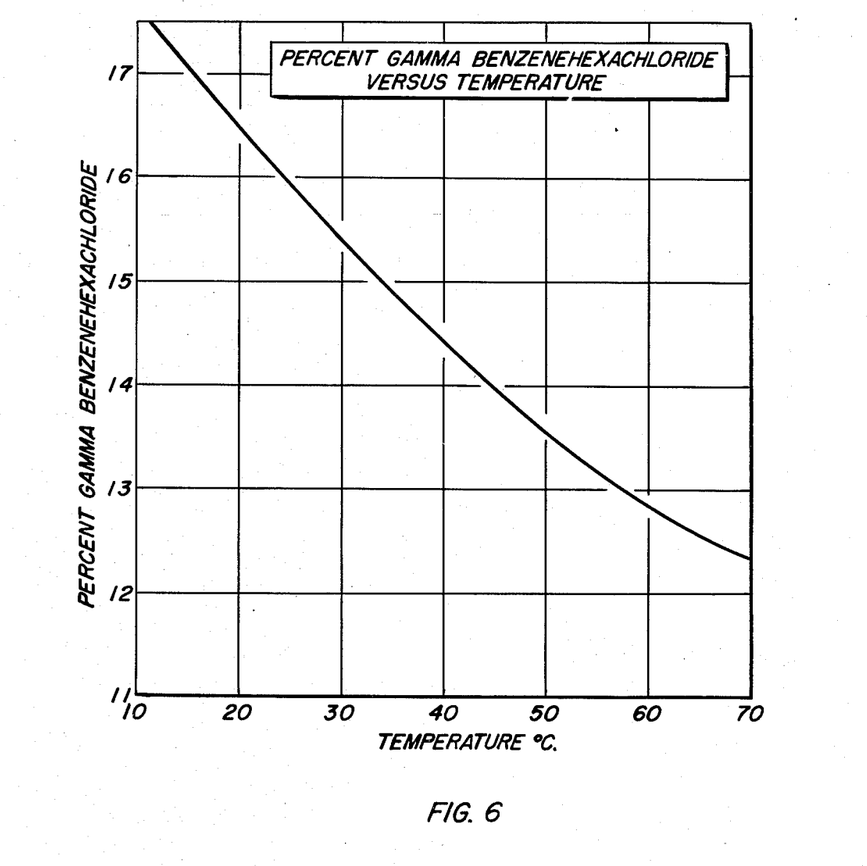
Figure 6 is a graph in which percent gamma in the benzene hexachloride product is ploted versus temperature.

The temperature reduction in the reactor effected by recycle of the product stream from the first reactor has an important bearing on the weight percent of the valuable gamma isomer in the product. With particular reference to Figure 6, wherein the weight percent gamma isomer is plotted versus the average temperature of reaction in C°., it will be seen that the gamma concentration is reduced materially at higher temperatures.

At a KCT equal to 1.64 using 20° C. (68° F.) cooling water and a recycle velocity ratio of zero, the temperature in the reactor will be essentially 86.8° C. (196° F.). From Figure 6, it will be seen that the gamma concentration will be about 12 weight percent of the product. Under the same condition but using a recycle ratio of 2, the temperature in the reactor will be about 46° C. (115° F.) and the gamma concentration about 13 percent by weight. At 10 recycle ratio under otherwise similar conditions, the reaction temperature will be 31° C. (88° F.) and the gamma content will be about 15 percent.

In view of the relatively low concentration of the valuable gamma isomer relative to the concentration of the normally useless remaining isomers in the product, this increase of 3 percent of gamma isomer is at least comparable economically to a total increase of about 25 weight percent in the production of crude benzene hexachloride. In addition, by increasing the percentage of gamma in the product, the problem of disposal of the useless isomers of benzene hexachloride is substatially minimized and the operational and raw material cost of the additional benzene hexachloride is completely eliminated.

The recycle velocity ratio may also be increased to reduce the chlorine concentration differential between the inlet and outlet of the first reactor to provide more uniform conditions throughout the reaction and, thus, to maintain a substantially uniform reaction rate and heat evolution, due to the reaction, in all parts of the reaction zone.

A recycle velocity ratio of between about 4 and about 20 is generally desired. Within this range, the chlorine, using most feed ratios, is essentially immediately soluble in the reactor feed stream and very efficient heat conductivity characteristics are obtained. Also, within this range there is a sufficient differential between the percent conversions of chlorine from a recycle of 4 to a recycle of 20 so as to permit an accurate control by varying the recycle ratio over the product composition of the first stage product to compensate for variations in the purity of the feed streams, which impurities or poisons tend to vary the rate of the desired reaction.

The first stage or recycle stage of the reaction is preferably carried out to obtain between about 70 and 95 percent conversion of chlorine to benzene hexachloride. While lesser or greater conversions may be obtained, lesser conversions tend to minimize the overall beneficial results of the recycle operation, whereas, as is believed apparent from Figures 3 and 4, greater conversions require excessively high recycle ratios. As noted above, increased recycle ratios do not proportionately increase the solubility of the feed chlorine or the differential in the percent conversion of chlorine to benzene hexachloride. Thus, maximum flexibility for the process is afforded in the recycle velocity range of between 4 and 20, as noted above.

Figure 7:
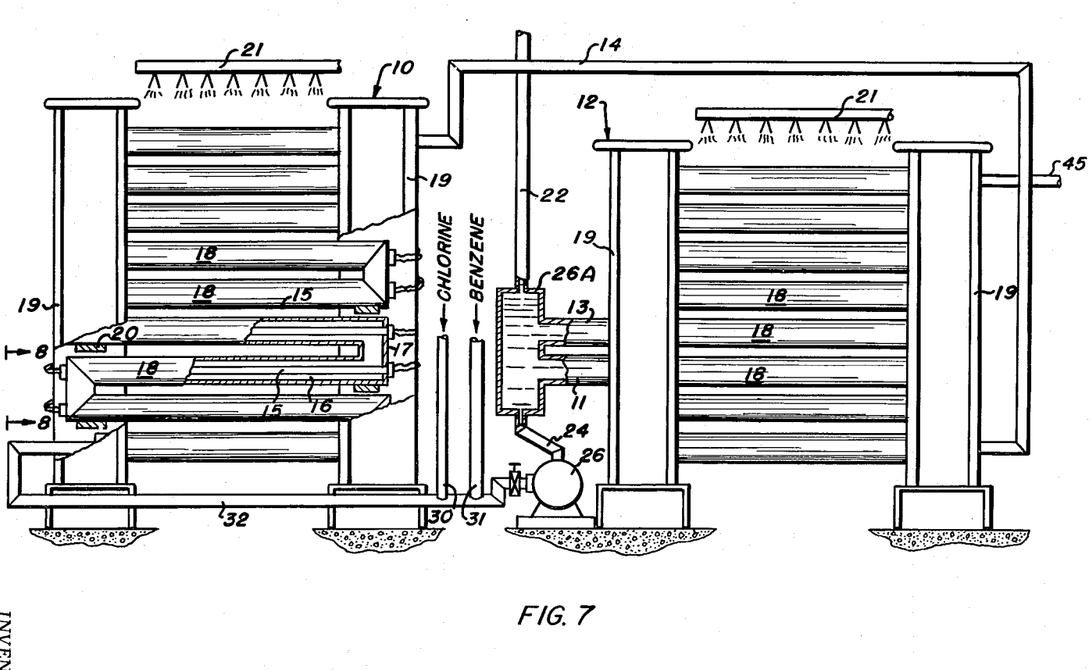
Figure 7 is a schematic elevational view, partly in section of an apparatus for carrying out a preferred embodiment of the present invention.
Figure 8:
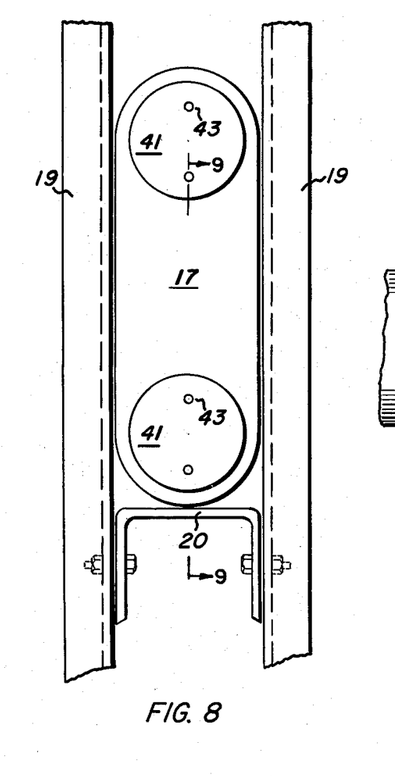
Figure 8 is an enlarged fragmentary elevational view taken substantially along the line 8—8 of Fig. 7.

With particular reference to Figure 7, a simplified form of apparatus is illustrated for carrying out the process of the present invention. This specific apparatus is not intended to limit the scope of the invention since the process may be carried out in a wide variety of process equipment. Substantially any apparatus provided with a reaction zone having means for recycling a portion of the reaction products at variable recycle velocity ratios relative to the feed may be used to advantage in carrying out the present process.

As shown in Figure 7, the apparatus comprises two separate reaction sections, 10 and 12 arranged in series, each section having a plurality of tubes or pipes of the same transverse dimensions. In this embodiment, the primary reaction stage of the process is provided for by the tubes of the reaction section 10 and the three lowermost tubes of reaction section 12, including, in all, 12 lengths of tubing. The tubes of the section 10 are interconnected with the tubes of reaction section 12 by means of line 14. The secondary reaction stage of the process is provided by the remaining portion of reaction section 12 including the 5 upper-most lengths of tubing. The primary and secondary stages of the reactor are interconnected through a hold-up drum 26 by means of tubing extensions 11 and 13.

Actinic light to activate the reaction of the benzene and chlorine is provided by fluorescent tubes 40 (see Figure 9) positioned centrally within each of the lengths of tubing of the sections 10 and 12 within a protective tube 15. Preferably two fluorescent tubes are employed in tandem in each protective tube. The reaction zone comprises a series of annular spaces 16 extending the entire length of each of the tubes and including also the interconnecting vertical tubes 17 at alternate ends of the reactor section. The cooling system employed for cooling the various reaction sections as shown consists of a plurality of nozzles 21 positioned above each reaction section and adapted to direct a continuous stream of cooling water or other suitable coolant over the external surfaces of the tubing.

The reaction section 10 and 12, more specifically, is formed of nine and eight separate lengths of tubing 18 respectively positioned horizontally and aligned vertically. Each section is provided with a pair of standards 19 and a plurality of U-shaped braces 20 adapted to support opposite ends of the individual tube lengths. The protective tube is constructed of a translucent material such as heat resistant glass and the tubing 18 is formed of any durable material preferably having high heat conducting properties.

The holdup drum 26, interconnecting the primary and secondary reactor sections, is vented by means of vent line 22 for discharge of minor amounts of waste gas, such as air, from the system. By this means, undesired gases may be quickly and efficiently displaced from the system after a single pass through the reactor without unduly limiting the capacity of the reactor or materially reducing the reaction rate of the process. The lower end of the holdup drum is connected by means of a pipe 24 to a recirculating pump 26 which recycles a portion of the product of the first reaction section from the holdup drum 26A to the inlet end of reaction section 10. Fresh chlorine and benzene are fed into the reactor through lines 30 and 31, respectively and the latter join with the recycle stream from the recirculating pump prior to entry into the reaction through line 32.

Figure 9:
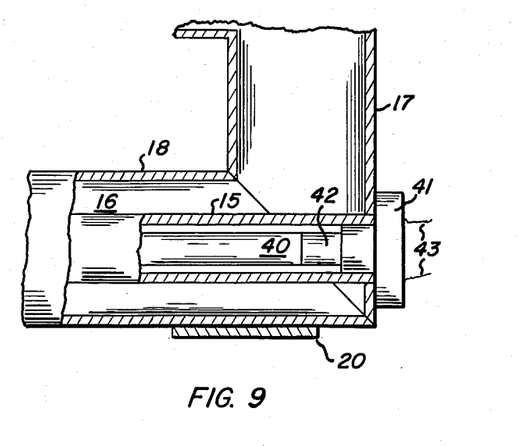
Figure 9 is a fragmentary sectional view taken substantially along the line 9—9 of Figure 8.

As shown particularly in Figure 9, the fluorescent light tubes 40 are supported within the protective glass tube 15 and are electrically connected to a suitable source of electric power by means of a plug 41. The latter provides a reduced socket portion 42 extending within the tube 15 having a pair of openings (not shown) in the end thereof for receiving the conventional contact terminal pins (not shown) on the end of such fluorescent tubes. The electrical wires 43 are connected to an electrical source (not shown).

In operation, the absolute quantity of material continuously processed in the primary reactor 10 is a substantial multiple of the quantity passed through the secondary reactor 12, the larger proportion of the effluent from the primary reactor 10 preferably being recirculated by pump 26.

The following examples illustrate two modes of carrying out a process embodying the features of the present inventions.

*Example I*

Chlorine is fed to the apparatus of Figure 7, through line 30 at the rate of 639 pounds per hour. Concurrently, benzene is fed through line 31 at the rate of 5181 pounds per hour. This feed mixture is passed to the main reactor feed line 32, wherein it is combined with 58,868 pounds per hour of a liquid mixture delivered by pump 26, this mixture having the following composition in percent by weight:

| | Percent |
|---|---|
| Chlorine | 1.1 |
| Benzene | 84.3 |
| Benzene hexachloride | 14.6 |

Upon the mixing action in the main supply line 32, the resultant overall feed to the primary reactor 10 has the following composition in weight percent:

| | Percent |
|---|---|
| Chlorine | 2.0 |
| Benzene | 84.8 |
| Benzene hexachloride | 13.2 |

This feed stream is introduced to the primary reactor 10. Cooling water at a temperature of about 20 degrees centigrade is sprayed from the cascade coolers 21 at a rate sufficient to maintain the reacting mixture at a temperature of 30 degrees centigrade. The reactor solution is discharged to holdup drum 26A. A portion, about 9.8 percent by weight of the reactor output, is drawn off through line 13 and fed to the upper tubes of the reactor section 12 forming the secondary reaction stage. The composition of this stream is the same as the recirculated mixture noted above. The ratio of recirculated material to the amount of fresh feed to the primary reactor is about 10:1 or, in other words, the recycle velocity ratio is 10. The gamma percentage of the benzene hexachloride product obtained through line 45 is somewhat above 15 percent by weight. The reaction rate constant (K) in reciprocal minutes is 1.5.

The conversion of chlorine to benzene hexachloride in the first reactor is about 91 percent and the final product from the second reactor is substantially free of unreacted chlorine.

The actinic irradiation of the reacting mixture in this example is provided by the fluorescent tubular light sources 40. These are fluorescent lights emitting predominately in the region of slightly below 4800 Angstrom units wave length, being "Blue" fluorescent lights.

*Example II*

The reaction may be also conducted in the apparatus illustrated in Figure 7, under conditions generally conforming to the details of Example I but only reacting approximately 90 percent of the chlorine in the first reaction stage. The remaining 10 percent of the reaction is accomplished in the second reaction stage or chlorine clean-up stage. In this comparative example, 1090 lbs./hour of benzene hexachloride is produced having only about 12 percent gamma concentration. The cooling water temperature is 32° C. and the recycle velocity ratio is only 2.

When the present process is conducted, for example, with recycle velocity ratios between about 4 and 20, or when the process is carried out with somewhat varying temperatures and chlorine concentrations, generally similar results are obtained. In general, reducing the temperature about 11 centigrade degrees, increases the gamma concentration one weight percent. The specific data for such varied operation of the process is presented herein in the form of graphs shown in Figures 1–6 inclusive.

While the present invention has been described with reference to the manufacture of benzene hexachloride, it should be apparent that a wide variety of other addition reactions may be conducted employing the principles of the present invention while obtaining similarly advantageous results. For example, other gaseous halides may be reacted with benzene in the presence of actinic light to form corresponding halogenated cyclohexane compounds. Thus, bromine may be reacted with benzene under known conditions to form benzene hexabromide in a flow-type continuous reactor in two stages while recycling a major portion of the benzene hexabromide reaction mixture from the first stage reactor. Other aromatic homologues of benzene, such as toluene, may also be halogenated in a similar manner.

Chlorine or other halogens may also be reacted with olefins and dienes in accordance with the present invention to produce corresponding halogenated addition products. For example, ethylene dichloride may be manufactured by reacting gaseous chlorine and ethylene in the presence of a suitable catalyst, such as iron. In this reaction liquid ethylene dichloride is formed. The gaseous reactants ethylene and chlorine are only soluble to a limited extent in the ethylene dichloride product under normal operating conditions. However, when a major proportion of the product of the above reaction is recycled in accordance with this invention, the solubility of the ethylene and chlorine in the liquid ethylene dichloride product is substantially increased. Accordingly the reaction capacity of an apparatus employed for carrying out the reaction is correspondingly increased and the heat dissipating characteristics of the system is materially improved. The employment of a recycle of the reaction mixture provides substantial flexibility and controllability to the process, which features were not inherent in prior processes of this type.

Propylene dichloride, butylene dichloride, diisobutylene and higher homologues may be also produced in a similar manner while obtaining the benefits of the present invention. Moreover other halogen compounds such as ethylene dibromide, propylene dibromide and the like may be similarly formed.

The present invention is not limited to halogenation since any addition reaction between a gaseous reactant and a liquid reactant or between gaseous reactants in a suitable solvent may be conducted in accordance with the principles of this invention. For example, olefins and dienes may be reacted with a hydrohalide to produce corresponding halogenated compounds. Thus, hydrogen chloride may be reacted with isobutylene, such as with a ferric chloride or zinc chloride catalyst, to form butyl chloride. Likewise, hydrogen chloride may be added to butadiene to form 3-chloro-1-butene and 1-chloro-2-butene. Higher conjugated dienes such as isoprene and peperydiene react similarly.

Hydrogen chloride may also be added to halogenated hydrocarbons such as allyl chloride, allyl bromide, 2-chloro propylene, vinyl bromide, and vinyl chloride to form corresponding addition products. For example, when allyl chloride is reacted with hydrogen chloride 1,2-dichloro propane is formed. Likewise when allyl bromide is reacted with hydrogen chloride 1-bromo-2-chloro propane is formed. The reaction of hydrogen bromide with vinyl chloride results in the formation of 1,1-dichloroethane.

Hydrogen bromide or hydrogen fluoride may be substituted for hydrogen chloride in any of the above reactions. Thus, when reacting the allyl bromide with hydrogen bromide, such as in the presence of small quantities of ferric chloride, 1,2-dibromide propane is formed. In the presence of peroxides, hydrogen bromide may be reacted with allyl bromide to form 1,3-dibromide propane. Similar results may be obtained with vinyl bromide and vinyl chloride. The reaction of hydrogen bromide with butadiene to form 3-bromo-1-butene and 1-bromo-2-butene may also be carried out in accordance with the novel features of this invention.

As is believed apparent from the foregoing, the present invention provides a process for manufacturing benzene hexachloride having an exceptionally high gamma isomer distribution without the necessity of expensive and complicated refrigerating equipment. The recycle operation of this process permits the production of a product having a wide variety of concentrations of benzene hexachloride in benzene solvent without the critical disadvantage of large gaseous phases in the feed stream and in the initial stages of the reactor. The novel recycle feature of the present process also provides flexibility in actual operation of the process, heretofore unattainable in prior processes, by providing a positive means for attaining optimum operating conditions with any given process equipment and permits variations in the operation of the process to compensate for varying quantities of impurities in the chlorine or benzene feed, thus providing a uniform benzene hexachloride product. In addition, by virtue of the recycle operation undesired gases such as air may be readily and easily removed from the reactant stream instead of remaining in the system over the total reaction period of the process.

This process also permits the use of a minimum length of reaction zone, and thus maximum economy in reaction equipment, while still providing the desired and necessary contact time for the reactants and the advantages in heat dissipation inherent in high mass velocity flow of reactants through the reactor.

We claim:

1. A continuous process for the manufacture of benzene hexachloride comprising the steps of continuously reacting benzene and chlorine in the presence of actinic light in an excess of benzene in a first reaction zone to react between about 70 and 95 percent of said chlorine, recycling a major portion of the reaction solution containing chlorine and benzene hexachloride in benzene solvent through said first reaction zone in a weight ratio above about 4:1 relative to the weight of fresh feed reactants, and introducing the remaining portion of the reaction solution into a second zone to substantially complete the reaction of chlorine with benzene.

2. The process of claim 1 wherein the portion recycled is in a weight ratio of between 9:1 and 11:1 relative to the weight of the fresh feed reactants.

3. The process of claim 1 wherein the weight ratio of the recycled portion and of the feed chlorine and benzene is between about 4:1 and 20:1.

4. A process of claim 1 wherein the temperature of the reaction is between about 15°–40° C.

References Cited in the file of this patent
UNITED STATES PATENTS

| | | |
|---|---|---|
| 2,529,803 | Gonze | Nov. 14, 1950 |
| 2,552,562 | Kauer et al. | May 15, 1951 |
| 2,622,105 | Miller et al. | Dec. 16, 1952 |

OTHER REFERENCES

Neil et al.: Canadian Chemistry and Process Industries, vol. 32 (April 1948), pp. 335–340.